(12) United States Patent
Fusari et al.

(10) Patent No.: US 8,528,066 B2
(45) Date of Patent: Sep. 3, 2013

(54) METHODS AND APPARATUS FOR ENABLING CONTEXT SHARING

(75) Inventors: David Fusari, Groton, MA (US); George Hartz, Andover, MA (US)

(73) Assignee: Microsoft Corporation, Redmond, WA (US)

( * ) Notice: Subject to any disclaimer, the term of this patent is extended or adjusted under 35 U.S.C. 154(b) by 613 days.

(21) Appl. No.: 12/547,331

(22) Filed: Aug. 25, 2009

(65) Prior Publication Data
US 2011/0055912 A1 Mar. 3, 2011

(51) Int. Cl.
*H04L 29/06* (2006.01)

(52) U.S. Cl.
USPC .............................................. 726/8; 726/12

(58) Field of Classification Search
USPC ....................................................... 726/8, 12
See application file for complete search history.

(56) References Cited

U.S. PATENT DOCUMENTS

| | | | |
|---|---|---|---|
| 6,993,556 B1 | 1/2006 | Seliger et al. | |
| 7,093,020 B1* | 8/2006 | McCarty et al. | 709/229 |
| 7,328,435 B2* | 2/2008 | Trifon | 717/171 |
| 7,346,648 B1 | 3/2008 | Seliger et al. | |
| 7,660,845 B2 | 2/2010 | Fusari | |
| 2002/0107875 A1 | 8/2002 | Seliger et al. | |
| 2002/0184507 A1* | 12/2002 | Makower et al. | 713/182 |
| 2003/0233400 A1* | 12/2003 | Pinal | 709/201 |
| 2005/0027584 A1 | 2/2005 | Fusari | |
| 2005/0027784 A1* | 2/2005 | Fusari | 709/200 |
| 2005/0060535 A1* | 3/2005 | Bartas | 713/154 |
| 2005/0084105 A1 | 4/2005 | Fusari et al. | |
| 2005/0137908 A1 | 6/2005 | Fusari et al. | |
| 2005/0160371 A1 | 7/2005 | Karson et al. | |
| 2005/0165790 A1 | 7/2005 | Seliger et al. | |
| 2006/0075020 A1 | 4/2006 | Seliger et al. | |
| 2006/0080141 A1 | 4/2006 | Fusari et al. | |
| 2009/0307311 A1 | 12/2009 | Fusari | |
| 2010/0114960 A1 | 5/2010 | Fusari et al. | |
| 2010/0146046 A1 | 6/2010 | Fusari | |

FOREIGN PATENT DOCUMENTS

WO    WO 03-105443    12/2003

OTHER PUBLICATIONS

Trevor, Davis, "jQuery Linline Form Labels," Jun. 16, 2009, date accessed Jan. 30, 2012. http://trevordavis.net/blog/jquery-inline-form-labels.*
Trevor, davis, "jQuery Linline Form Labels, " Jun. 16, 2009, date accessed Sep. 14, 2012. http://trevordavis.net/blog/jquery-inline-form-labels.*
International Search Report and Written Opinion for International Application No. PCT/US2010/053747, mailed Apr. 29, 2011.

* cited by examiner

*Primary Examiner* — Jung Kim
*Assistant Examiner* — Carlos M De Jesus, Jr.

(57) ABSTRACT

Some embodiments relate to processing a web page requested by a web browser. The requested web page is received, and additional code is inserted into the web page that alters and/or augments the functionality of the web page. The web page is then forwarded to the web browser that requested it. The browser executes the code inserted into the web page, thereby augmenting the functionality of the web page.

64 Claims, 8 Drawing Sheets

METHODS AND APPARATUS FOR ENABLING CONTEXT SHARING

FIELD OF THE INVENTION

The present invention relates to techniques for managing context among software applications in a networked environment.

BACKGROUND OF THE INVENTION

There exist commercial endeavors in which a plurality of computer application programs share a set of entities or subjects which are common to the application programs. For example, in the field of medicine, multiple different application programs may be used to store and manage different types of a data about the same patient. One application program may be used to store and manage clinical information about the patient, such as the patient's medical history, another application program may store and manage financial information about the patient, such as billing and insurance coverage information, while another application program may be used to store scheduling information, such as the date and time of the patient's scheduled future visits.

As another example, in the field of law, multiple different application programs may be used to store and manage information about the same client or case. A docketing application program may be used to store and manage information about upcoming deadlines and tasks to be performed with respect to the client or case, a billing application program may be used to store and manage information regarding the amount of attorney time spent on that client or case and the amounts charged to a particular client or for a particular case, and a document management application program may be used to store and manage documents created for a particular client or case.

Although a medical patient or a legal client or case are illustrative examples of entities or subjects that may be common to multiple different application programs, there are many other entities or subjects about which multiple different application programs may store different information. For example, the identity of a user of multiple different application programs is an example of a subject that is common to multiple application programs.

Data which describes a given entity or subject, and which is used commonly by a plurality of applications, is referred to herein as a "context" defined by that subject, and may be shared by two or more applications.

To access information about a particular entity or subject (e.g., a particular patient or legal case) from multiple different application programs, a user typically must individually sign in to each application program, and enter information into each application program that identifies the particular entity in which the user is interested. The desirability of managing context so that a user need not individually sign in to multiple different application programs and repeatedly enter the data describing the subject of interest into each of these application programs has been recognized. Examples of these techniques include single sign on (SSO) systems (i.e., wherein a user logs in to a single network-based resource and is automatically given access to other authorized network-based resources). As another example, a standard for context management, known as the Health Level 7 (HL7) context management specification, was published in 1999 by the Clinical Context Object Workgroup (CCOW). The CCOW standard defines a context management architecture (CMA) and processes for managing information describing a subject across a range of clinical and other healthcare-related applications. Examples of subjects that may define contexts shared by multiple different applications include a patient, a patient encounter, clinical provider, observation, insurer, and other subjects or entities.

Some of the application programs that may share context may be programs that are installed on the user's computer, some of the application programs may be web-based application programs that are hosted on a web server (which may be either inside or outside of the user's corporate network) and are accessed via web browser on the user's computer, and some of the application programs may be application programs hosted on a remote application server (e.g., a Citrix MetaFrame server, a Windows Terminal Server, or the like) that are emulated on the user's computer using an emulation client.

As mentioned above, a number of different techniques have been developed to enable two or more application programs to share context, such that a user need not individually sign in to each application program and/or need not separately enter information into each application program identifying a subject or entity of interest. For example, some of these techniques are designed to enable a user to enter sign on information only one time and, as a result, automatically be signed into multiple different application programs. Other of these techniques are designed to enable a user to enter or change context information in one of multiple different application programs and have each of the other application programs automatically change their context in the same way, without the user having to enter the context in each of those application programs. As an example in the medical field, upon detecting a user bringing up information about a patient in a clinical records application program (e.g., by entering information identifying the patient of interest into the application program), context sharing techniques may automatically change the context of the billing application program and the appointment scheduling application to the context defined by that particular patient.

One of these prior art techniques for context management is referred to herein as the "context-conforming application" technique. As this name implies, each application program is built or modified to conform to a context sharing technique that enables it to communicate with a central context manager, provide its context changes to the central manager, and receive context change updates in other application programs from the context manager.

As mentioned above, the CCOW standard is a known standard for context management. Among other features, the CCOW standard defines interfaces for inter-process communication, including communication between applications and a software-based module which coordinates the modification of data across applications (the "context manager"). One embodiment of a context manager is described in commonly-assigned U.S. patent application Ser. No. 09/545,396, which is incorporated herein by reference in its entirety.

The interfaces ("technology mappings") defined by CCOW provide for communication between the context manager and various "styles" of applications, including those which follow the Microsoft Common Object Model (COM) and Hypertext Transport Protocol (HTTP) conventions, among others. For example, for a COM-based application, the CCOW standard specifies COM interfaces which allow the COM-based application to exchange data and parameters with the context manager when using a CCOW compliant context management system. The interfaces may be programmed to process COM-based data and parameters provided by the context manager and context participant applications to support the context management functions.

FIG. 1 depicts an exemplary context management system, in which a context manager 230 manages context for two context participant applications 210 and 220. Applications 210 and 220 may execute on the same or separate computers, and the computer(s) may be the same or separate from a computer on which context manager 230 executes. Communication between the processes may be enabled via any of numerous combinations of protocols and physical communications devices or components. For example, when the applications 210, 220 and/or the context manager 230 execute on the different computers interconnected by a network (e.g., a local area network), the TCP/IP protocol may be employed.

According to the CCOW standard, communication between the applications in a context and the context manager is facilitated through the use of context participant (CP) interfaces for the applications and a set of context manager (CM) interfaces for the context manager. Each of the CP and CM interfaces may comprise any of numerous suitable components for enabling inter-process communication. For example, each of the CP and CM interfaces is integrated in an associated application and provides a "plug" which enables communication with the application (e.g., CP interfaces 217, 227 may be implemented within applications 210, 220 respectively, and CM interface 235 may be implemented in an application program executing on the computer on which the context manager 230 executes). In the illustrative system of FIG. 1, the applications 210, 220 have CP interfaces 217, 227, respectively, associated with them.

Context participant (CP) interfaces 217 and 227, respectively, receive communications from context manager 230 on behalf of applications 210, 220. Applications 210, 220 may receive communications from the context manager 230 in a format and style commensurate with the CCOW standard (e.g., as COM messages or HTTP encoded messages over TCP/IP). In the embodiment shown, the communications pass through code portions 214 and 224 associated with the applications. CP interfaces 217, 227 may alternatively be incorporated directly into applications 210, 220 as described above, and directly pass communications thereto.

Context manager (CM) interface 235 receives communications from applications 210 and 220 and forwards those communications to the context manager 230.

As mentioned above, each of applications 210 and 220 includes a series of programmed routines integrated with the respective application code to perform context management support functions as defined by the CCOW standard. For example, applications 210 and 220 include code portions enabling communication with the context manager. Specifically, within application 210, code portion 212 defines messages sent to the CM interface 235, and code portion 214 implements the CP interface 217. Similarly, application 220 includes code portions 222 and 224 that, respectively, perform the same functions as code portions 212 and 214.

When a user of one of the applications (e.g., application 210) desires to switch the context by changing the data for a subject (e.g., switching from one patient to another), the application sends a request to the context manager 230 (via CM interface 235). The requesting application is referred to as an "instigator" of the requested change in the context.

When the context manager receives a request to change a subject of the context, context manager 230 surveys the other applications in the context (e.g., application 220), to determine whether the switch is acceptable to them. The context manager 230 performs the survey by sending a request to the other applications (e.g., application 220) via their associated CP interfaces. The other applications in the context may determine whether the subject change is acceptable or conditionally acceptable. While rules defining the acceptability of a subject change may be customized for specific applications and contexts, an example of a situation where a requested change may be conditionally acceptable is if data relating to the existing subject has not yet been written to permanent memory on the computer on which the application executes. In this example, the other application may respond to the survey by alerting the instigator that the data could be lost if a change proceeded. The surveyed applications respond to the survey by transmitting messages back to the context manager 230 describing their reactions to the requested change.

According to the CCOW standard, the context manager 230 communicates the results of the survey to the instigator application, and a user thereof examines the results and determines how to proceed. There are a range of options that the user can select, including canceling the requested change, executing the requested change, or removing the instigator application from the shared context. Any of these options can be selected by the user irrespective of the results of the survey. For example, if one or more of the surveyed applications indicates that the requested change is unacceptable to it, the instigator application may nevertheless force the context change, or alternatively, may simply remove itself from the shared context so that the instigator application can implement whatever changes it desires without impacting the other applications in the context. After the user decides how to proceed with the requested change, a call is made by the instigator application to the context manager 230 informing the context manager of the change decision. The context manager then makes one or more calls to publish the change decision by notifying the other applications in the context of the decision.

The above-discussed techniques rely upon context-conforming (also referred to as context-enabled) applications that have the capability to perform the above-described operations to enable their participation in sharing context. A technique referred to as "bridging" has been used for applications that do not conform to the CCOW standard. In this technique, the CM and CP interfaces are custom coded to be able to send data to and receive data from an application that is not context-enabled. Thus, these CM and CP interfaces may serve as a "bridge" that manipulates the application (e.g., by simulating mouse clicks and other user input). The bridging technique relies on software installed on the client machine to manipulate the application to change context or to notify the context manager when a change in an application's context is detected. In many cases, the software that is installed on the client is an interpreter that interprets executes a bridge script. Thus, the bridge may be thought of as a script that is executed by an engine or interpreter that is installed on the client. In some cases, rather than being implemented as a script, a bridge is implemented as hard-coded software that executes on the client. As used herein, "installed software" refers to non-transient executable software code that is stored in non-volatile memory within the client computer. One example of the above-discussed bridging technique is described in detail in pending U.S. patent application Ser. No. 10/632,673, which is hereby incorporated by reference in its entirety.

FIG. 2 is a diagram of an illustrative system in that provides context-sharing among a plurality of different application programs. In the illustrative system of FIG. 2, a desktop 300 (which may be executed on a single computer) executes three basic types of applications i.e., a locally installed and executing application (e.g., a COM-based application) 310, a browser 330 for a web-based application executing on a web server 500, and an emulation client 340 (e.g., a Citrix Independent Computing Architecture (ICA) client) emulating an application executing on a remote application server (i.e., a Citrix MetaFrame server) 600. Desktop 300 also includes a COM adapter 320 to facilitate communication between applications that employ different communication protocols (e.g., application 310 which uses COM-based standards for communication and application 530 on web server 500 that uses web-based protocols). In the embodiment shown, COM adapter 320 translates COM-based communication from application 310 to HTTP-based communication, and translates HTTP-based communication to COM-based communication for receipt by application 310.

Browser 330 communicates with a web server 500 via a network 700. Web server 500 executes a web-based context participant application 530. The illustrated desktop 300 also executes a emulation client 340, which is in communication with a remote application server 600 to initiate a session 610 within which one or more context participant applications may execute.

Context server 400 executes multiple context manager sessions 410A-C. In the example depicted in FIG. 2, context manager session 410A manages context for all the applications represented, including COM-based application 310, web-based application 530, and the remote application 615. To communicate with COM-based application 310, context manager session 410A transmits messages to COM adapter 320 via CP interface 375, and receives messages from COM adapter 320 via CM interface 420. To communicate with web application 530, context manager session 410A transmits messages to web server 500 via CP interface 510 and receives messages from web server 500 via CM interface 420. Finally, to communicate with the remote application 615, context manager session 410A transmits messages to COM adapter 617 executing on remote application server 600 via CP interface 640, and receives messages from COM adapter 617 via CM interface 420.

When a web application participates in a context, it is the application (e.g., application 530 in FIG. 2) executing on the web server that is the context participant, rather than the browser. Typically, when a change to the context is executed, the context manager publishes the change decision to the applications in the context. However, in the case of a web application, when the change in context occurs, the change takes place in the application 530 on the web server 500. However, because the web server does not initiate communication with the browser, the browser 330 may not be automatically made aware of the change, such that the representation of the state of the application 530 on the desktop 300 may be inaccurate. Thus, in the example of FIG. 2, a listener 335 is employed to assist in instructing the browser 330 to request updated information from its corresponding web server 500 when a change has been made to the web application 530 executing thereon. Listener 335 provides an interface (e.g., a CCOW interface) that the instigator application (i.e. the application that initiated the change in context) can contact to inform it that a change in the context has been made, so that the listener 335 can instruct the browser 330 to go back to the web server 500 for an update. When the context manager (e.g., session 410A) returns the survey information to the instigator application relating to a requested change, the context manager also provides a list of URLs (corresponding to the listeners for any web-based applications in the context) to the instigator application, instructing the instigator application to contact (or "touch") those URLs to inform them that the context has been updated. When the instigator application is another application executing on the same desktop 300 as the browser 330 (e.g., the COM-based application 310), the instigator application can directly (e.g., through the COM adapter 320) contact the listener 335, as the URL for the listener 335 will be accessible from within the desktop.

In addition, the desktop 300 also includes a Context Management Registry (CMR) interface that the desktop can query to determine the identity (e.g., find the URL for) of a context manager to manage a context. In the embodiment of the invention illustrated in FIG. 2, the CMR interface 352 is implemented by a locator 350 provided on the desktop 300, with the CMR interface 352 being a plug into the locator 350. The CMR interface 352 can be queried by the COM-based application 310 (via the COM adapter 320) or the browser 330 to request the identity of the appropriate context manager (e.g., one of the context manager sessions 410A-C). When a context is initially being established (such that no context manager has been assigned to it), the locator 350 uses a URL provided in the CMR interface 352 to contact the context management server (e.g., context server 400) to initiate a context session. The communication from the locator 350 to the context server is directed to a location service (LS)(having a plug 421) that forms part of a context system 423 that manages the multiple context manager sessions 410A-C. Thus, this communication goes through a private interface, rather than through the CM interface 420 for any context manager session. When the locator 350 contacts the location service of the context system 423 to request a new context manager session, the context system 423 initiates a new context manager session 410A-C and returns to the locator 350 a URL that uniquely identifies the CM interface 420 for the new context manager session.

In the system of FIG. 2, a number of different software components are installed on the desktop 300. For example, a listener 375 for browser 330 is installed to notify the browser of changes in context, a COM adapter 330 is installed to notify listener 375 of changes in context, and a locator 350 is installed to enable the desktop to locate the context server 400. In addition, a context manager (CM) interface 420 is used to receive notifications of change in context from the web server and a context participant (CP) interface 510 is used to notify the context manager of changes. CM 420 and CP 510, or portions thereof that perform bridging, may also be installed on desktop 300. In addition, the application executing on the web server must be modified to conform to the CCOW standard.

As an alternative, rather than using a web-based application program that conforms to the CCOW standard, a bridging can be used. For example, a bridge may execute on desktop 300 to interact with the browser and communicate with the context manager.

Another known technique for providing single sign-on functionality for web-based application programs is referred to herein as "browser redirection." While this technique provides SSO functionality, it does not enable ongoing context management/sharing, once a user is logged in. In this technique, when a web browser requests a sign on page from a web server to access a web-based application, the web server determines if the user is logged in. If the user is not logged in, the browser is redirected to a login server. The user provides his or her sign on information to the login server and, upon verifying that the sign on information is correct, provides a token (e.g., in the form of a unique identifier or encrypted data) on a redirect URL that is passed to the user's browser. The user's browser is then redirected to the web server hosting the web-based application that the user is attempting to access and the web server retrieves the token from the URL. The web server then uses the token to verify the user's identity (e.g., by communicating with the login server or a separate policy server), determine if the user is permitted to access the application hosted on the web server, and automatically sign the user into the application. Thus, once the token has been established, the user may access the web-based application or other web-based applications that accept the token without having to enter sign on information. This technique requires that the web-based application program be modified and additional software be installed on the web server to be able to recognize the token, verify the user's identity, and determine whether the user is permitted to access the application program.

Another known technique for providing single sign-on functionality for web-based application programs, without otherwise enabling the sharing of context between these application programs is referred to herein as "proxy sign on." In this technique, an organization's domain name service (DNS) server is configured to map the domain names of web-based applications to a proxy server. The proxy server forwards requests from the user's browser to the web server hosting the application, receives the requested web page, and determines whether any of the requested web pages are login pages. If a login page is recognized, the proxy server, in a manner that is transparent to the user and the user's browser, determines if the user is already authenticated. If the user has not been authenticated then a separate login page is returned to the user's browser. The user enters his or her credentials in the login page and the proxy server validates the user's identity. Once the user has been authenticated, the proxy server retrieves the user's sign-in information for the original web page from a database or single sign-on server, and submits the sign-in information to the web server. Once the user is logged in, the proxy server simply passes requests from the browser to the web server and returns the responses from the web server to the browser and does not interact with the application.

This technique works with web-based application programs that allow login by simple submission of sign on information, but may be difficult to use with other application programs. That is, for example, some web-based application programs include code (e.g., JavaScript code) in a login page that must be run in the user's browser in order for the user to successfully sign in. Such code may, for example, apply a cryptographic hashing function to the user's password before it is returned to the web server. The proxy server would not be able to successfully sign in to such an application program because it merely provides the user's sign on information to the web server without executing the code that hashes the sign in information before it is submitted. Moreover, this technique presents additional challenges when the session between the web browser and the web server is encrypted (e.g., using transport layer security (TLS), secure sockets layer (SSL), or another encryption protocol). That is, when the web pages sent from the web server to the browser are encrypted, the proxy server may be unable to determine whether a web page is a login page and may be unable to submit the user's login information in encrypted form.

SUMMARY OF THE INVENTION

One embodiment is directed to a method of processing at least one web page of a web-based application program hosted by at least one web server. The method comprises acts of: receiving a request for the at least one web page from a web browser executing on a client computer; obtaining the at least one web page of the web-based application program in response to the request; transforming the at least one web page by inserting, in the at least one web page, software code that is not a part of the web-based application program, to generate a modified web page, wherein the software code, when executed by the web browser on the client, augments the functionality of the at least one web page; and forwarding the modified web page to the web browser. Another embodiment is directed to at least one computer readable medium encoded with computer instructions that, when executed by a computer having a processor for executing computer instructions, perform the above-described method, A further embodiment is directed to a computer comprising: at least one I/O port for receiving incoming communications and sending outgoing communications; and at least one controller that: receives, from a web browser executing on a client computer separate from the computer, a request for at least one web page of a web-based application program hosted by at least one web server; obtains the at least one web page of the web-based application program in response to the request; transforms the at least one web page by inserting, in the at least one web page, software code that is not a part of the web-based application program, to generate a modified web page, wherein the software code, when executed by the web browser on the client computer, augments the functionality of the at least one web page; and forwarding the modified web page to the web browser.

DETAILED DESCRIPTION

Figure 1:
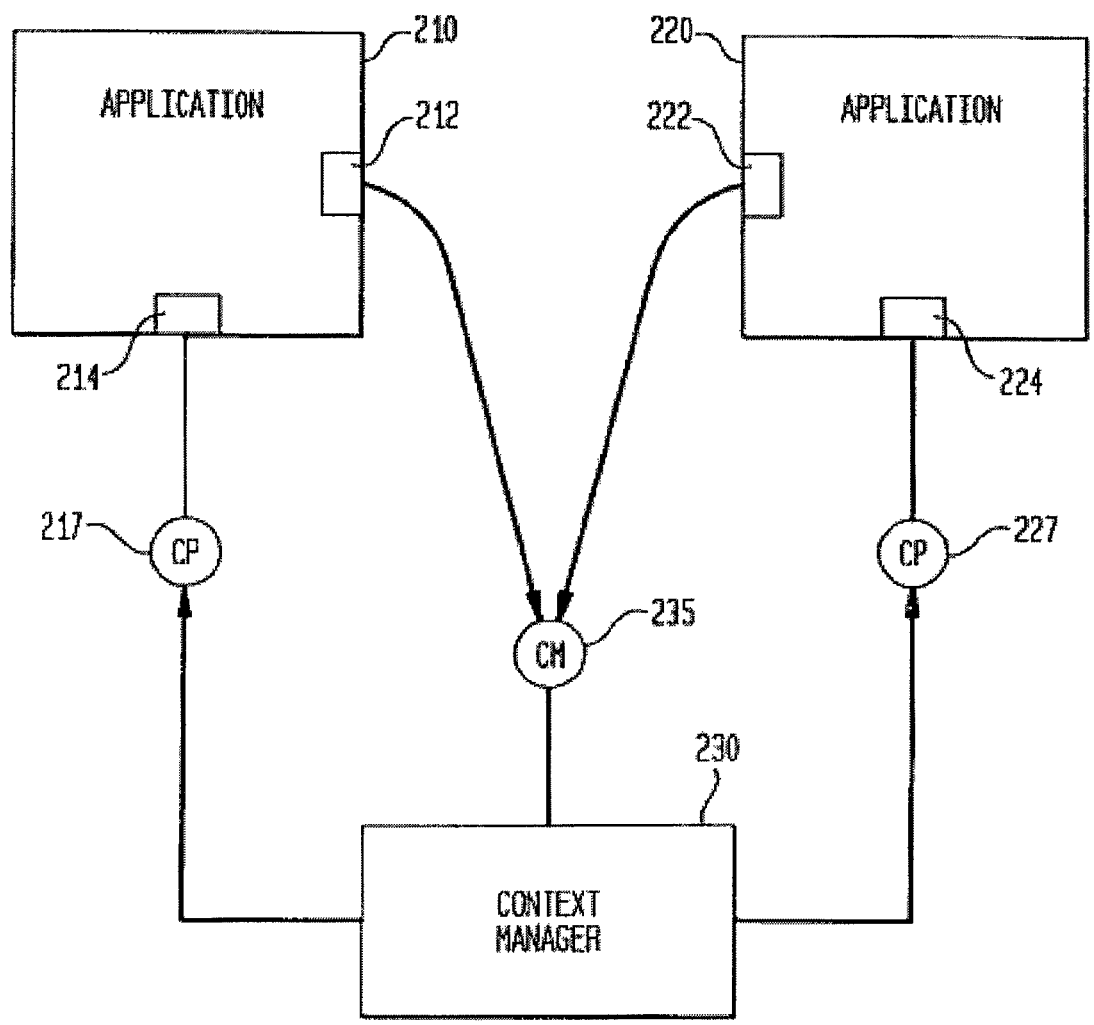
FIG. 1 is a block diagram of a known implementation of a context manager and a plurality of context participant applications.
Figure 2:
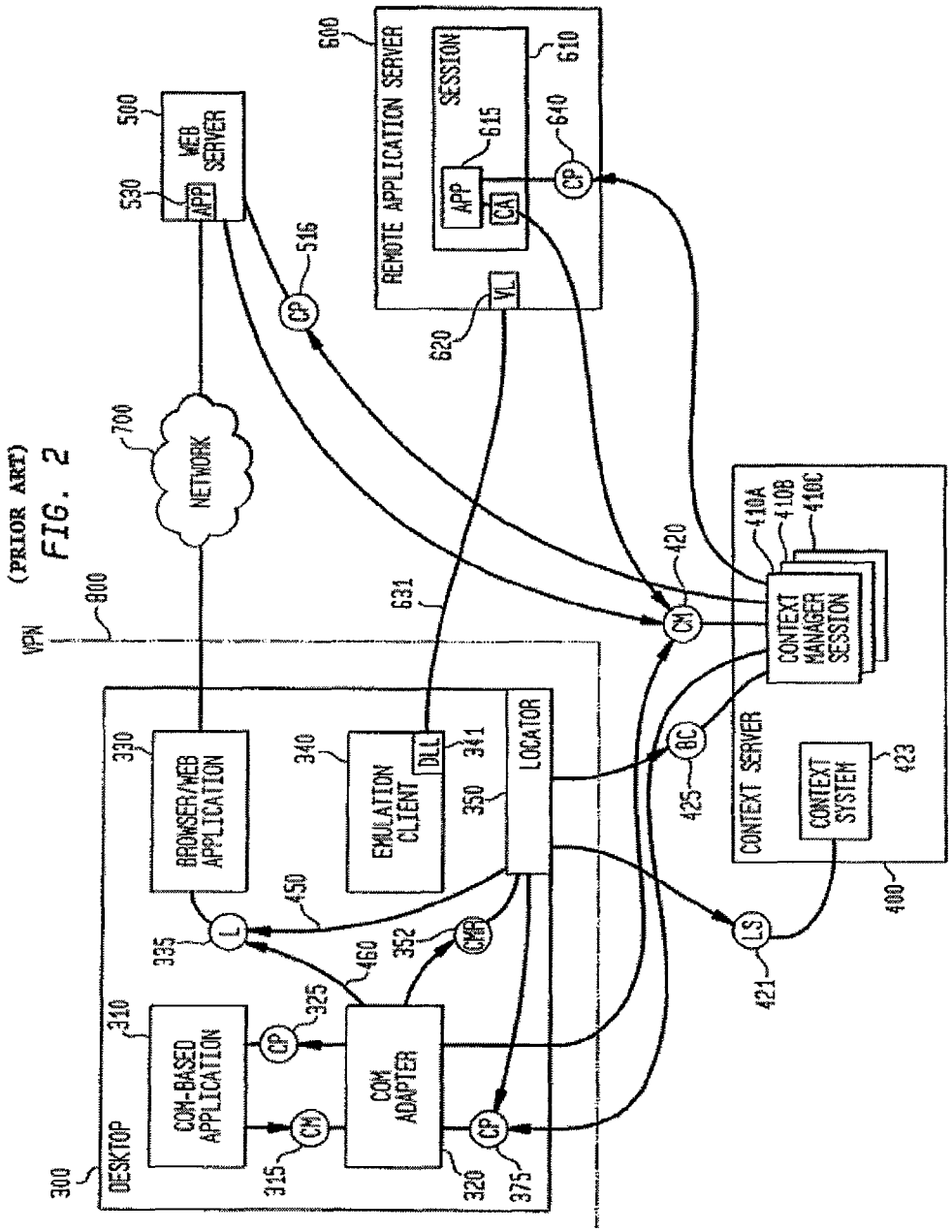
FIG. 2 is a block diagram of a prior art system that provides context sharing among different types of applications accessed via desktop.

The inventors have appreciated that, while the above-discussed techniques provide single sign-on functionality and/or other forms of context sharing between application programs, each of these techniques either requires software be installed on the client machine to operate, requires that the application programs that participate in sharing context be programmed to be context-enabled applications, or only works with certain types of application programs.

For example, some of these techniques, such as the "context-conforming application" technique and the "browser redirection" technique work only with application programs that are programmed to be context-enabled. The inventors have appreciated that these techniques are disadvantageous because there may be application programs that users desire to use, but that are unable to support SSO functionality or other context sharing functionality because they were not programmed to do so.

In addition, some of these techniques, such as the "browser redirection" technique, and the "proxy sign on" technique provide some single sign on functionality, but do not otherwise enable application programs to share context. Further, the "proxy sign on" technique works only with web-based applications in which login is accomplished via simple submission of login information (e.g., via a blind post), and does not work with applications in which the sign on page must be rendered in a user's browser in order successfully log in.

Some of the above-discussed techniques, such as the "bridging" technique and the "standard-conforming application" technique, require that software be installed on the user's computer to enable single sign-on and/or other types of context sharing functionality. The inventors have appreciated that it may be desirable in some circumstances to allow one or more application programs to participate in sharing context without having any software installed on the computer to enable or facilitate true context sharing. For example, the inventors have appreciated that software installed a user's machine consumes storage space on the user's machine and consumes processing resources when this software is executing. In addition, the inventors have appreciated that requiring that this software be installed on the user's computer limits the ability of the user to access web-based application programs from other computers and still enjoy the context sharing functionality.

That is, one of the benefits of using web-based applications instead of traditional client-server applications is that the web based applications typically may be accessed from any suitable computer that has Internet access and a web browser, without the user having to install an application on his or her computer. Thus, the inventors have appreciated that because some of the existing context-sharing techniques described above (e.g., the "bridging" and "context-conforming application" techniques) require that software be installed and configured on each computer on which the user wishes to use the context sharing functionality, the computers from which a user can access these web-based applications and enjoy context-sharing functionality are limited to those on which the required software is installed and configured.

Thus, the inventors have appreciated that it would be desirable to provide context sharing functionality for a web-based application program without requiring that this application program be programmed to be context-enabled and without requiring that software that enables or otherwise supports context sharing be installed on the user's computer.

To this end, the inventors have developed a technique involving inserting software code into a web page that enables and/or facilitates SSO and/or other types of context sharing for a web-based application. The inventors have appreciated that this technique for inserting software code into web page has broader applicability than facilitating context-sharing, and thus the invention is not limited to use of this technique for enabling and/or facilitating SSO or other types of context sharing for a web-based application.

Thus, some of the embodiments are directed to augmenting the functionality of a web page by inserting software code into the web page. In some embodiments, the software code that is inserted into the web page may enable SSO functionality for web-based application programs. In other embodiments, the software code that is inserted into the web page may provide other types of context sharing for a web-based application program. In other embodiments, the software code that is inserted into the web page may provide enable both SSO functionality and other types of context sharing for web-based applications.

In some embodiments, a technique for providing SSO functionality and/or other context-sharing functionality for a web-based application program may be provided that does not require that the application program be programmed to be a context-enabled application program. In some embodiments, a technique for providing SSO functionality and/or other context-sharing functionality for a web-based application program may be provided that does not require that software facilitating the context-sharing functionality be installed and/or configured on the user's computer.

In some embodiments, when a web browser requests a web page that forms part of a web-based application program, code is inserted into the web page, prior to the web page being received by the browser, that augments the functionality of the web page. The inserted code may provide any functionality, as the invention is not limited in this respect.

In some embodiments, the inserted code may enable and/or facilitate context sharing. This may be accomplished in any of a number of ways, as embodiments of the invention are not limited to any particular implementation technique.

Figure 3:
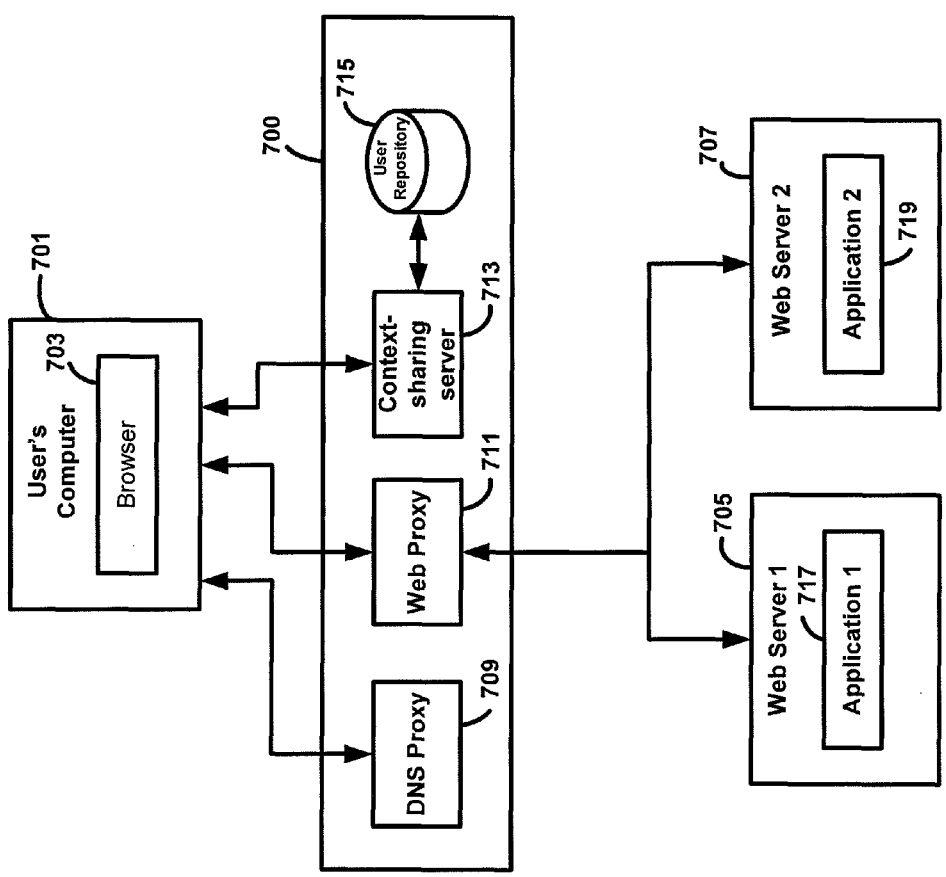
FIG. 3 is a block diagram of an illustrative computer system in which some embodiments may be implemented.
Figure 4A:
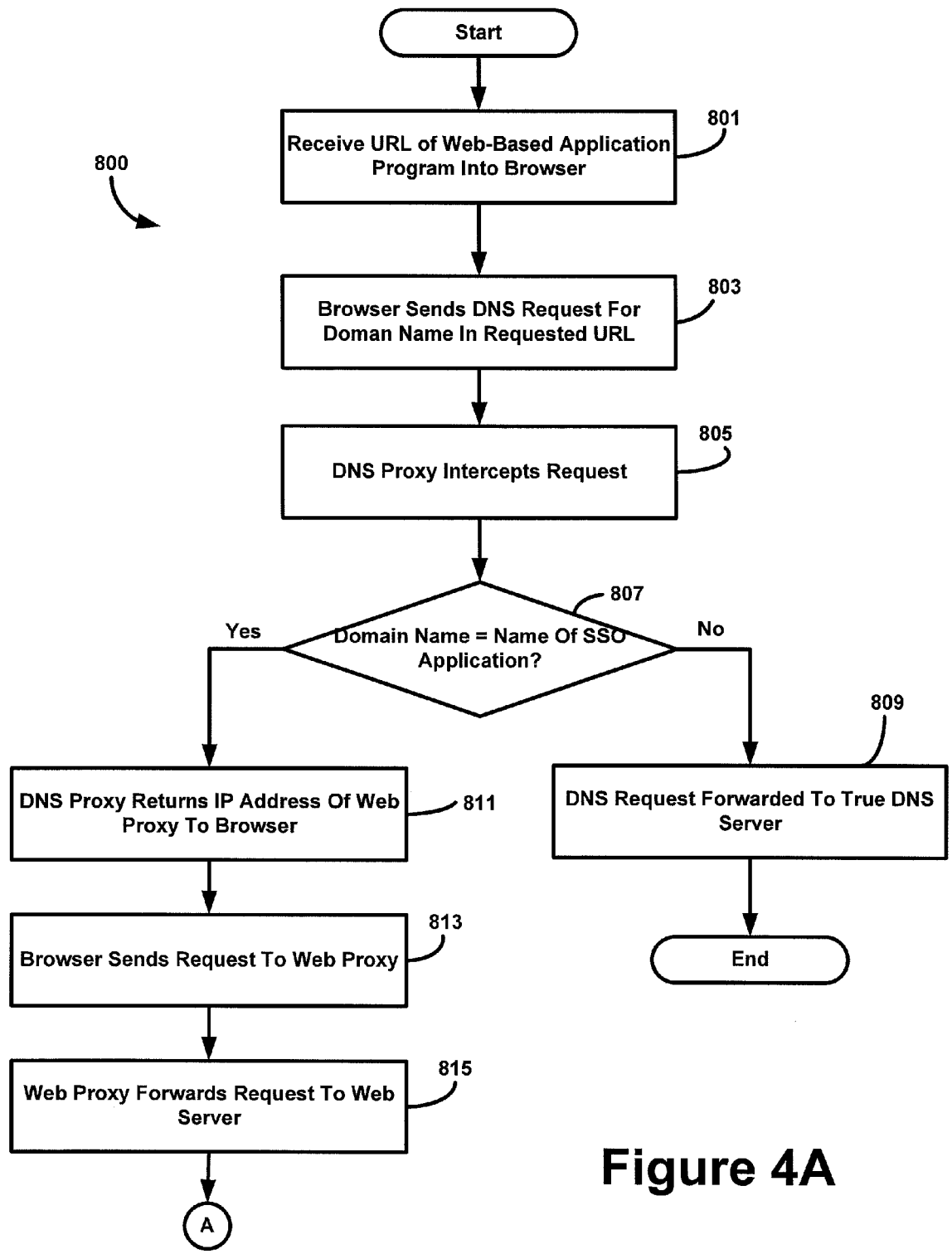
FIGS. 4A-4D show a flow chart of an illustrative process for enabling single sign on functionality among web-based application programs, in accordance with some embodiments.
Figure 4B:
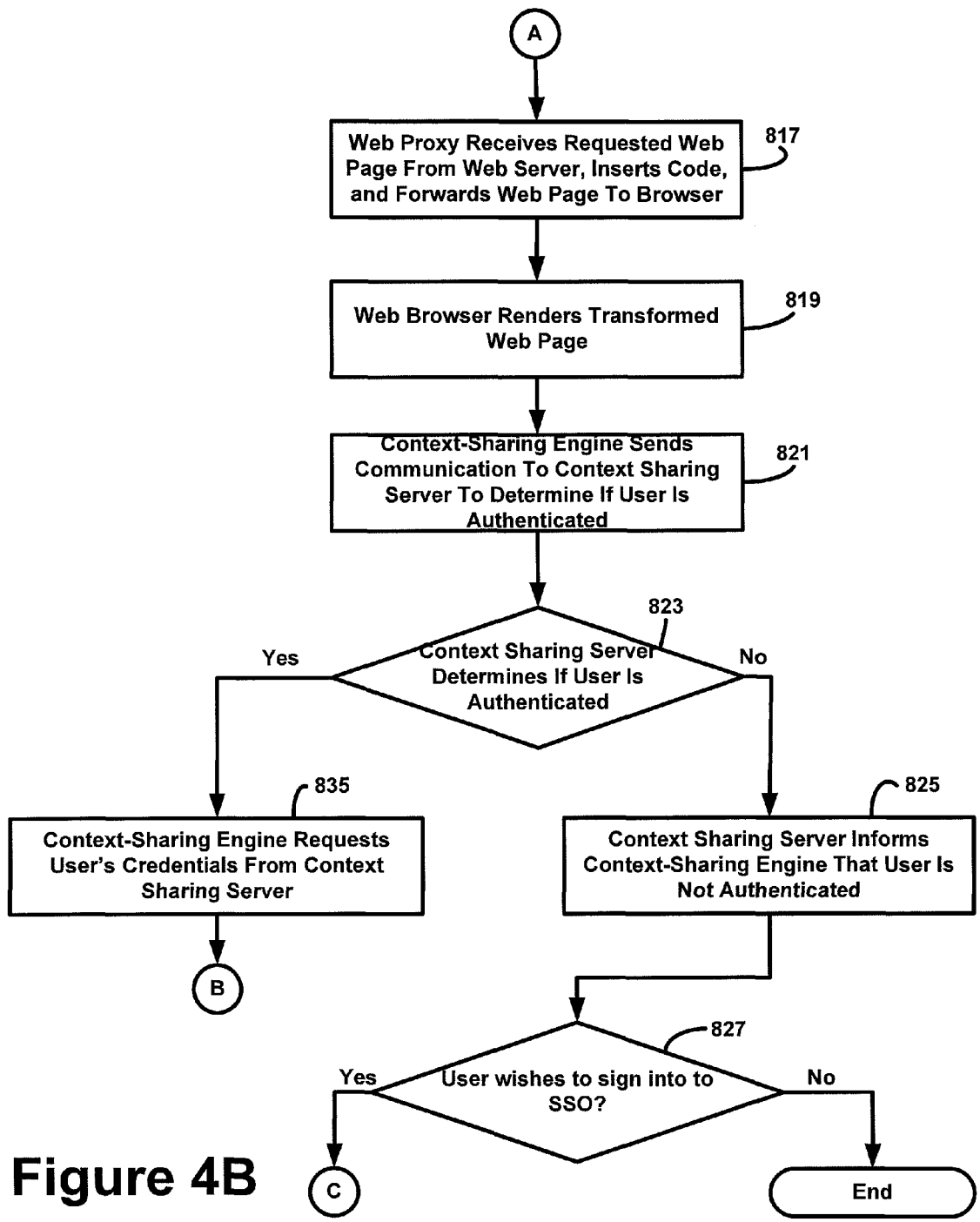
Figure 4C:
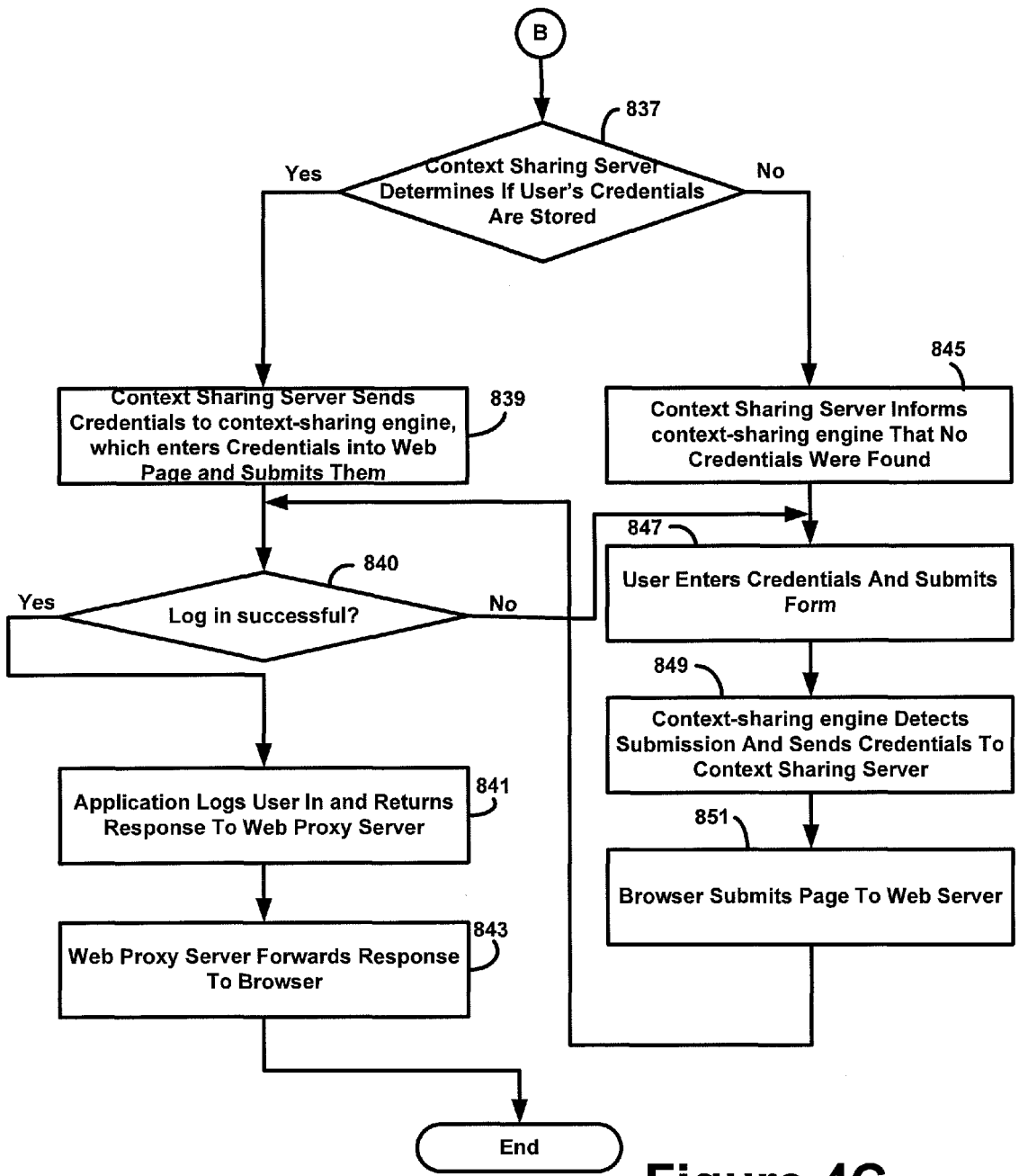
Figure 4D:
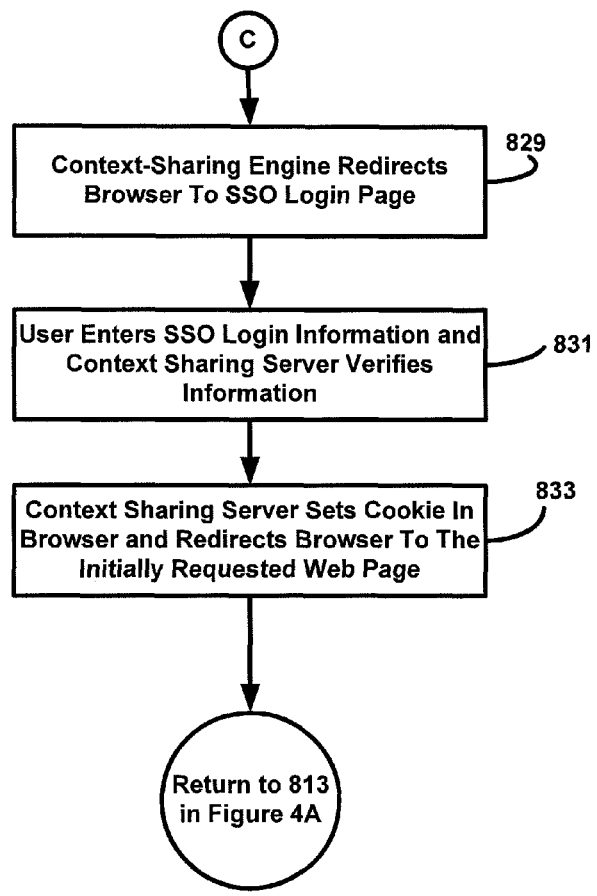

FIG. 3 shows an illustrative context management system 700 in which aspects of some embodiments of the invention may be implemented. FIG. 3 shows a user's computer 701 which executes a web browser application 703. The user may wish to access a first web-based application program 717 hosted on a web server 705 and a second web based application program 719 hosted on the same or a different web server (e.g., web server 707). Context management system 700 comprises a domain name service (DNS) proxy 709, a web proxy 711, a context-sharing server 713, and a user repository 715.

DNS proxy 709 enables redirection to web proxy 711 of requests from browser 703 that are intended for a web server hosting an application for which context-sharing functionality is being provided. DNS is a known type of service that maps human-readable names to IP addresses of web servers. For example, DNS may map the name "sentillion.com" to the IP address of a server. Thus, when a user inputs a name (e.g., sentillion.com) into a web browser, the browser determines the IP address of the server that the user is attempting to access by sending a request to the known address of a DNS server that indicates the name and receiving a response from the DNS server that indicates the corresponding IP address.

DNS proxy 709 intercepts DNS requests from browser 703 to a DNS server. When it identifies a request for a domain that matches a URL pattern of an application for which context-sharing functionality is being provided by the context management system 700, the DNS proxy responds with the IP address of web proxy 711. If there is no match, the DNS proxy forwards the request to a true DNS server. Thus, for DNS requests for application programs for which context-sharing functionality is being provided by the context management system 700, the response from DNS proxy 709 causes the browser to send requests to web proxy 711, rather than the web server that actually hosts the application.

It should be appreciated that using a DNS proxy, such as DNS proxy 709, to intercept DNS request from the browser is one example of a technique by which requests from browser 703 that are intended for a web-based application may be redirected to web proxy 711. The invention is not limited to this particular technique, as any other suitable technique may be used. For example, in some embodiments, rather than using a DNS proxy, a true DNS server may simply be reconfigured to map names of application programs for which context-sharing functionality is being provided to the IP address of the web proxy, rather than the IP address of the web server hosting the application. In other embodiments, the web browser may simply be configured to use a proxy, such that the browser sends requests to the IP address of the web proxy, rather than the IP address of the server hosting the requested pages.

Web proxy 711 receives redirected requests from browser 703 and forwards these requests to the web server hosting the web-based application that the browser is attempting to access. As such, the web server returns the requested web pages to web proxy 711, rather than to workstation 701 on which browser 703 executes. When web proxy 711 receives a requested web page from the web server, it may transform the web page by inserting code into the web page that alters and/or augments the functionality of the web page. The web proxy may then forward the transformed web page to the web browser on workstation 701. This causes the web browser to, in addition to rendering the web page and executing any code included by the web application program, also execute any code inserted by web proxy 711.

Web proxy 711 may insert software code into a web page in any suitable way. For example, in other embodiments, the software code may be directly inserted into the text of the web page. In some embodiments, a URL at which the software code is located may be inserted into the text of the web page, causing the browser to retrieve the software code from the location specified by the URL (e.g., context-sharing server 713 or any other suitable location). In some embodiments, some of the software code may be directly inserted into the text of the web page and some may be inserted by specifying the URL at which the software code is inserted. In the examples described herein, the software code is inserted by web proxy 711. However, the invention is not limited in this respect, as any suitable entity may insert desired code into the web page.

Any type of software code that the browser is capable of executing may be inserted, as the invention is not limited in this respect. For example, in some embodiments, the software code may be a client side script, which may be written in the JavaScript language or another client-side scripting language, but any other suitable technique may be used.

The software code that is inserted into a web page may add any suitable functionality to the web page or may alter the functionality of the web page in any suitable way, as the invention is not limited in this respect. In some embodiments, the functionality that the added software code provides may enable the web based application to share context (e.g., by enabling SSO, by sharing context in any of the ways discussed above, or in any other way). This may be accomplished by facilitating communication between the browser and the server 713 or in any other suitable way, as the invention is not limited in this respect.

DNS proxy server 709, web proxy 711, and context sharing server 713 may be implemented in any suitable way, as the invention is not limited in this respect. In some embodiments, each may be implemented as a software component that executes on one or more general purpose computers, each having one or more hardware processors that execute the software components stored thereon and at least one hardware storage device (e.g., one or more volatile memory devices and/or one or more non-volatile memory devices) that stores the software component. In some embodiments, DNS proxy server 709, web proxy 711, and context sharing server 713 may each operate on a separate general purpose computer(s) or processor(s), while in other embodiments all of these components may operate on the same general purpose computer(s) or processor(s). In still other embodiments, some of these components may operate on the same computer, while another operates on a separate computer. Similarly, user repository 715 may be stored in physical memory on the same computer on which context sharing server 713 operates or on a different computer. Likewise, computer 701 may be a general purpose computer having one or more hardware processors that execute browser 703 and one or more hardware memory devices that store the browser code. For example, computer 701 may be a workstation or any other type of computer capable of executing a browser, including, for example, a handheld computer (e.g., a personal data assistant) or mobile phone.

FIGS. 4A-4D show a flow chart of an illustrative process 800 by which context management system 700 may transform a web page by inserting code into the web page to enable the web based application to share context when the web based application may have no native ability to do so, and without requiring that context-sharing software be installed on the user's computer. In process 800, the nature of the context sharing relates to SSO, but it should be appreciated that this just an example of one type of context that may be shared, and the invention is not limited to sharing this or any other particular type of context.

In the example of FIGS. 4A-4D, the single sign on functionality facilitated by process 800 enables a user to provide a single set of authentication credentials (e.g., username and password) and then be automatically signed in to any password protected application program for which single sign on functionality is provided, even if the user has a separate set of authentication credentials for each application and even if the credentials for each or some particular application programs differ from the user's single sign on credentials.

Process 800 begins at act 801, where the system receives the URL of a web page as a result of computer 701 using browser 703 to navigate to the web page by entering the URL for the web page. The process then continues to act 803, where browser 703 sends a DNS request for the domain name specified in the URL. The process next continues to act 805, where DNS proxy 709 intercepts this DNS request, and then to act 807, where DNS proxy 709 determines whether the domain name in the request corresponds to a web-based application program for which context sharing (e.g., single-sign on) functionality is being provided. If it is determined that the request does not correspond to such a web-based application program, the process continues to act 809, where DNS proxy 709 forwards the request to a true DNS server and the process ends.

In some embodiments, in which the only context sharing functionality that is being provided is single sign on functionality, only browser requests for the log-in pages of web-based applications need be redirected to the web proxy, and the context-sharing engine may only be inserted into these log-in web pages. In such situations, at act 807, if the requested web page is not the log-in page for an application, the process continues to act 809.

If it is determined, at act 807, that the request does correspond to such a web-based application program, the process continues to act 811, where DNS proxy 709 returns the IP address of web proxy 711 to browser 703 in response to the DNS request.

The process next continues to act 813, where the browser sends a request for the URL to the IP address specified by the DNS proxy (i.e., the IP address of web proxy 711), and then act 815 where the web proxy forwards the request for the URL to the true web server. The process next continues to act 817, where the web proxy receives the requested web page from the true web server, transforms the web page by inserting code into the web page that enables the context sharing functionality not natively present (e.g., single sign on functionality), and forwards the transformed web page to the web browser. This inserted code can be thought of as a context-sharing engine that serves as an interface between the browser and context-sharing server 713 to enable single sign on functionality. The nature of the code that provides the context sharing capability (e.g., SSO functionality) can take any form, as the aspects of the invention described herein are not limited in this respect. For example, the inserted code can enable performance of any of the functions of context sharing software conventionally installed on a client machine and and/or natively programmed into a web-based application or remotely executing application.

The process next continues to act 819, where the web browser renders the transformed web page by sending requests for the content of the web page (e.g., images) and executing the code in the web page (e.g., JavaScript). Among the code executed by the browser is the code that was inserted into the web page by the web proxy (i.e., the context-sharing engine code). The browser's execution of the context-sharing engine causes the process to continue to act 821, where the context-sharing engine determines whether the web page is a login web page for the application (e.g., if the web page has a username and password field), and, if it is, sends a communication to context sharing server 713 to determine if the user of workstation 701 has authenticated for single sign on purposes (i.e., has provided his or her single sign on credentials to the context-sharing server). The process then continues to act 823, where context sharing server 713 determines if the user has authenticated. This may be done in any suitable way, as the invention is not limited in this respect. For example, in some embodiments, context sharing server 713 may track whether someone from workstation 701 has previously authenticated and is logged in for single sign on purposes. This may be done in any suitable way, as the invention is not limited in this respect.

For example, in some embodiments, when a user logs in for single sign on purposes, the context sharing server may internally create a session for that user and associate that session with a cookie that is sent to the user's web browser. The context sharing server, at act 823, may determine that the user has an open single sign on session (and has therefore already authenticated and logged in) by determining whether the user's browser has stored the cookie.

Once a session is established, the context sharing server may manage the session to control when sessions are maintained, when sessions are terminated, and when sessions are locked.

For instance, if a user is logged into two different web-based application programs (e.g., application program A and application program B) that are sharing context and is using two different browser windows to access these application programs, the user may spend some time accessing application program A, without accessing application program B. The inventors have appreciated that, because application program B does not receive any access requests from the user's browser during the time that the user is accessing application program A, application program B may automatically log the user out.

Thus, in some embodiments, the context sharing server employs a keep-alive technique by which keeps a user from automatically being logged out of application programs that are not being accessed by the user while the user is accessing a different application program. This may be accomplished in any suitable way, as the invention is not limited in this respect.

In some embodiments, the context-sharing engine in a browser window may have a timer that causes the context-sharing engine to periodically (e.g., every two minutes) send a request to the application program. Thus, even if a user does not access a web page for a period of time (e.g., two minutes), then the context-sharing engine executing in that web page sends an access request to the application program to simulate user activity so that, from the point of view of the application program, the user is still accessing the application program. Thus, because the application program believes the user is still accessing the application program, the application program does not automatically log out the user.

In some embodiments, the context sharing server may provide a locking technique, whereby when a user has not accessed any of the web-based application programs that are participating in a context sharing session and to which the user is logged in for a period of time, each of the browser windows may be locked. User interactions with each web-based application program may be monitored, and if there have been no user interactions with any of the web-based application programs for some period of time (e.g., fifteen minutes), the context sharing server may send a communication to the context-sharing engine in each of the user's browser windows being used to access the application programs to lock the browser windows. The context-sharing engine may "gray out" or otherwise disable the browser window, but may keep the user logged into each of the application programs using the keep-alive technique discussed above. The context-sharing engine executing in each browser window may prompt the user for his or her SSO sign on credentials before unlocking the application.

The context sharing server may determine that the user has not accessed any of the web-based application programs for the period of time in any suitable way, as the invention is not limited in this respect. For example, in some embodiments, the proxy server (or a filter executing on the web server of the application program) can identify access requests sent from the user's browser(s) to the application program and differentiate these requests from the access requests automatically generated by the context-sharing engine for keep-alive purposes. The proxy server (or filter executing on the web server) may notify the context-sharing server whether the user is active and/or has not accessed the application program for a given period of time. If none of the application programs participating in the context sharing session have been accessed for the period of time, then the context-sharing server may notify each context-sharing engine to lock its browser window.

In some embodiments, the context-sharing engine in each browser, rather than the proxy server or filter executing on the web server, may determine whether the user is actively accessing the corresponding application program and may notify the context-sharing server of the user's activity or inactivity. This may be done in any suitable way. For example, the context-sharing engine may monitor the user's mouse and/or keyboard activity, and may periodically notify the context-sharing engine of user activity or lack thereof.

In some embodiments, in addition to or instead of providing locking based on inactivity, the context-sharing engine in each browser window may include code that causes a locking button to be displayed on the web page that, when selected by the user, causes the browser windows for all application programs participating in the context session to be locked, or provide for a hotkey combination (e.g., CTRL+L), that when input by the user via a keyboard causes each browser window to be locked.

Context sharing server 713 may log a user out of single sign on in any suitable way. In some embodiments, when a user closes all browser windows referencing the cookie received from the context sharing server, the cookie may be deleted and the user's session on the context sharing server may eventually time out from inactivity. Alternatively, in some embodiments, the user may explicitly request a log out via his or her web browser and, in response, context sharing server 713 may end the user's session.

Ending the user's session on context sharing server 713 may communicate to the context-sharing engine in the user's browser that the user has been logged out of single sign on. This may be done in any suitable way. For example, when the code is inserted at act 817, one of the items that is inserted may be an instruction to send a request to context sharing server 713 for an indication that the session associated with the cookie in the browser is still valid. If the context sharing server 713 has ended the session, then it would respond to this request by indicating that the session is no longer valid and that the user is logged out of single sign on. The code inserted into the browser (i.e., the context-sharing engine) may respond to this indication in any suitable way. For example, the context engine may log the user out of all application to which the user is logged in, or may only prevent the user from logging into to new applications without re-authenticating.

In some embodiments, a user may be automatically logged out of single sign on if the user has been inactive for a threshold period of time. For example, the context-sharing engine may detect that the user has been inactive for a period of time exceeding a threshold, and may, in response, send a communication to context sharing server 713 to end the user's single sign on session.

If the context sharing server determines that the user has not yet authenticated, the process continues to act 825, where the context sharing server sends a communication to the context-sharing engine indicating that the user has not authenticated. The process then continues to act 827, where the context-sharing engine displays a window asking the user if he or she wants to authenticate for single sign on purposes. If the user selects no, the process ends. If the user selects yes, the process continues to act 829, where the context-sharing engine redirects the browser to an SSO login page. The SSO login page may be hosted on any suitable server, as the invention is not limited in this respect. In some embodiments, the SSO login page may be hosted on context sharing server 713.

The process then continues to act 831, where the user enters his or her SSO authentication information in the SSO login page, submits this information to context-sharing server 713, and context sharing server 713 verifies that this information is correct. Context-sharing server 713 may verify the user's authentication information in any suitable way, as the invention is not limited in this respect. For example, in some embodiments, the context sharing server may determine whether the user-supplied authentication information matches authentication information for the user stored in user repository 715 or in an external LDAP server. If context sharing server 713 determines that the SSO credentials provided by the user are not valid (e.g., the user has supplied an incorrect password and/or username), then the user may be prompted to re-enter his or her SSO authentication information or the user's browser may be redirected to the web page that was initially being accessed without SSO functionality being enabled.

Once the user-supplied authentication information has been verified, the process continues to 833, where the context sharing server sets a cookie in the browser and directs the browser to re-request the web page (i.e., the page that the browser was initially attempting to access) from the web server hosting the web application via the web proxy. This causes the process to return to act 813, and proceed, as before, through acts 813, 815, 817, 819, and 821, to act 823.

At act 823, the context sharing server determines if the user has authenticated. Because the cookie that was set in act 833 is now present, context sharing server 713 access the cookie, determines that there is an open context session for that user, and may conclude from this that the user has already authenticated for SSO purposes. The process continues to act 835. If, prior to the expiration of the cookie set in act 833, the user subsequently attempts to access another web-based application program for which single sign on functionality is provided, steps 825-833 of process 800 need not be repeated because, at act 823, the context sharing server will recognize the cookie and determine that the user has already authenticated for single sign in purposes, and the process will continue to act 835, bypassing acts 825-833.

At act 835, the context-sharing engine executing in the browser sends a request to the context sharing server for the user's credentials (e.g., username and password) for the web-based application that the user is attempting to access from the context sharing server. The process then continues to act 837, where the context sharing server determines if there are credentials for that particular user stored in user repository 715.

If it is determined that there are user credentials stored in the repository, the process continues to act 839, where the context sharing server returns these credentials to the context-sharing engine, and the context-sharing engine automatically enters them into the web page and submits the web page to the web server hosting the application, via web proxy 711.

The process then continues to act 840, where it is determined in the log-in was successful (i.e., if the supplied credentials were valid). If the log-in was successful, the process continues to act 841, where the web-based application program attempts to log the user in and returns a response to the web proxy server.

Some application programs may include in the response a session cookie that may be used by the application program in future requests from the browser to track state. The process then continues to act 843, where the web proxy returns the web server's response to the browser, including any session cookie that was provided by the web server, and the process ends.

If, at act 837, the context sharing server determines that it does not have the user's credentials for the application program that the user is attempting to access, the process continues to act 845, where the context sharing server notifies the context-sharing engine in the browser that no credentials were found. The process then continues to act 847, where the user may enter his or her credentials for that particular application into the web page and submit the form to the web server. In some embodiments, the context-sharing engine may optionally modify the web page to notify the user that the credentials that the user is entering, in addition to being sent to the web server, will be sent to the context sharing server for storage and future use. This may be done in any suitable way, as the invention is not limited in this respect. For example, in some embodiments, the context-sharing engine may cause a watermark (e.g., a watermark that reads "single sign on" or any other suitable watermark) to be displayed in the input fields in which the user inputs his or her credentials.

The process then continues to act 849, where the context-sharing engine detects submission of the user's credentials, and sends the credentials to the context-sharing server which may store them in the user repository for future user. The process next continues to act 851, where the browser submits the page with user's credentials to the web server, via the web proxy. The process then continues to acts 840, 841, and 843, as discussed above, and then ends.

If, at act 840, it is determined that the log-in was not successful, the process continues to act 847, where the user can re-enter his or her credentials. In some embodiments, if the number of times that the user supplies incorrect credentials exceeds some threshold (e.g., five times), the process may end, and the user may not be permitted to log in to the application.

In the example of FIGS. 4A-4D, a proxy agent is used to intercept DNS requests from a user's browser and redirect the browser to the web proxy, which inserts the context-sharing engine code into the requested web page. However, the invention is not limited in this respect, as in some embodiments a DNS proxy and web proxy need not be used. For example, in some embodiments, the web server hosting the web-based application program may include an agent (referred to as a filter or ISAPI filter) that is configured to intercept web pages of the web-based application program, insert context-sharing engine code into these web pages, and forward the web pages to the browser.

As discussed above, in some embodiments, the code inserted into a web page by web proxy 711 (or by an agent executing on the web server) may, instead of or in addition to enabling single sign on functionality, enable the sharing of other types of context between a web based application and one or more other application programs of any type. This may be done in any suitable way, as the invention is not limited in this respect.

For example, in some embodiments, a user may desire to access two separate web-based application programs using two separate instances (e.g., windows) of web browsers running on the same computer. As used herein, each browser window in which a web page may be displayed may be considered a separate web browser. Thus, separate instances of the same web browser or separate tabs within a single instance of a web browser may be considered separate web browsers.

In the example of FIG. 3, a user may wish to access web-based application program 717 via a first browser 703 on workstation 701 and simultaneously access web-based application program 719 via a second browser (not depicted) on workstation 701. If the user decides to change some aspect of a context of application program 717 shared with application 719, it may be desirable to have web-based application program 719 change to the same context, and have that change reflected in the second web browser.

For example, if application program 717 is an application program for storing and managing clinical medical records of patients and application program 719 is medical billing program, a user may sign in to each application program using two separate browsers on workstation 701. If the user brings up the record of a particular patient in application program 717 via a first web browser, it may be desired to cause application program 719 to display the billing records for that same patient in the second browser.

As another example, if application program 717 is a first search engine (e.g., Google) and application program 719 is a second search engine (e.g., Live Search), an a user provides a particular search query (e.g., "dog grooming," "LCD televisions," a stock ticker symbol, or any other suitable search query) to application program 717 and receives search results from that application via the first browser, it may be desirable to cause application program 719 to also change context to that search query and display the results of that search query in the second browser. Numerous other types of context sharing also can be performed, as the invention is not limited in this respect.

Figure 5:
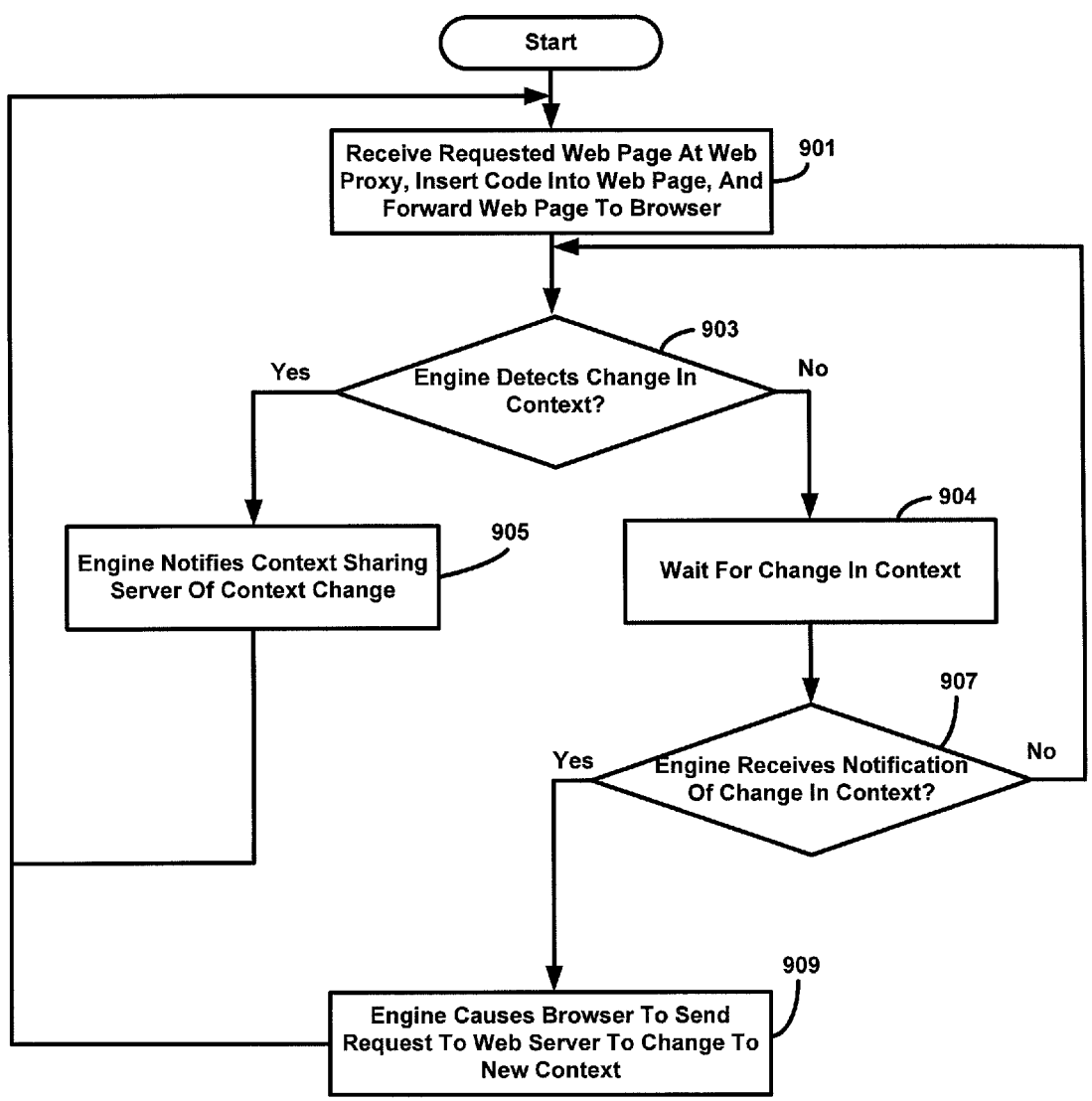
FIG. 5 is a flow chart of an illustrative process for enabling context sharing between web-based application programs, in accordance with some embodiments.

Context sharing between web-based application programs may be accomplished in any suitable way, as the invention is not limited in this respect. FIG. 5 shows an illustrative process 900 for enabling context sharing between web-based application programs for use in some embodiments.

In the example of FIG. 5, requests from a browser to a web-based application for which context-sharing functionality is being provided are redirected to a web proxy using any of the techniques described above (including, for example, DNS proxying) or any other suitable technique.

The process begins at act 901, where web proxy 711 receives a web page that forms a part of a web-based application (e.g., application program 717) and that was requested by browser 701, transforms the web page by inserting code into it, and forwards the transformed web page to browser 701. Web proxy 711 may insert code into the web page in any suitable way, including any of the ways discussed above or other suitable ways. The code that is inserted in the web page by web proxy 711 may be thought of as a context-sharing engine that enables context sharing functionality by sending updates in the change of context of the web-based application being accessed by the browser in which the engine is running to the context-sharing server and/or receiving updates in changes of context in other web-based applications from the context sharing server. Thus, in some embodiments, the code that is inserted into the web page may enable performance of any of the functionality of context sharing software conventionally installed on a client computer and/or natively programmed into a remotely executing application program.

The process continues to act 903, where the context-sharing engine determines if there has been a change in context in the web-based application being accessed by the browser in which it is running The context-sharing engine may determine if there has been a change in context in the web-based application program in any suitable way, as the invention is not limited in this respect. For example, in some embodiments, the context-sharing engine may determine that a change in context has occurred when the user, via his or her web browser, submits to the web server (e.g., via the web proxy) a request that would change the context of the application. For example, if a user decides to change the context of application program 717 to a new patient and sends a request to application program 717 to change context to that patient, the context-sharing engine may detect submission of this request and determine that a change in context has occurred. As another example, the context-sharing engine may detect a change in context is the user changes information on a web page. For example, when the user using a search engine, the context sharing engine may detect a change in context if the user performs a new search.

In some embodiments, when the context-sharing engine detects a change that may be considered a change in context, it may prompt the user as to whether the user wishes to initiate a change in context before initiating the change in context.

If the context-sharing engine determines that a change in context has occurred, the process continues to act 905, where context sharing engine sends a communication to context-sharing server 713, notifying the context-sharing server of the change in context and informing it of the new context.

When the context-sharing server is apprised of the new change in context, it may notify the context-sharing engines associated with other application programs that share context with application program 717 (which may be, for example, executing in other browsers on workstation 701) of the change in context. The context sharing server may notify the context-sharing engines of the change in context in any suitable way. For example, each context-sharing engine may periodically poll the context-sharing server to determine whether there is a change in context, and request the appropriate web page or take any other suitable action in response to any such change.

The process then returns to act 901, where the proxy server receives the web page from the web server that is provided in response to the user's request to change context, inserts code into this web page, and forwards the transformed web page to the browser.

If, at act 903, the context sharing engine does not detect any change in context in the web-based application program, the process continues to act 904, where the context-sharing engine waits for a change in context, and then to act 907, where the engine determines if any notifications have been received from context-sharing server 713 relating to changes in context in other web-based application programs with which context is being shared. If no such notifications have been received, the process returns to act 903. If a notification has been received, the process continues to act 909, where the context sharing engine causes the web browser to send, via the web proxy, a request to the web server on which its associated web-based application program is being hosted to change context to the new context. The process then returns to act 901, where the web page provided by the web server in response to the change in context is received.

The embodiments discussed above describe context sharing among a plurality of web-based applications. However, the invention is not limited to sharing context among web-based applications as, in some embodiments, context may be shared between web-based application programs and non-web-based application programs that are executing on a remote computer but are being displayed on the end user's computer, such as application programs executed on remote application server (e.g., a Citrix server) that are emulated on the user's computer using an emulation client and/or locally installed applications executing on the user's computer.

A remote application executing on a remote application server that is emulated on the user's computer using an emulation client may participate in a context-sharing session with web-based applications in any suitable way, as the invention is not limited in this respect. U.S. patent application Ser. No. 10/632,690, which is hereby incorporated by reference in its entirety, describes a technique by which a remote application that is emulated on a user's desktop may communicate, via one or more context-sharing software components installed on the remote application server, with a context sharing server and may participate in a context sharing session with other applications.

In some embodiments, such a remote application may join an existing context session in which a web-based application program participates. For example, a user may access remote application that is emulated on the user's desktop via a web portal that is hosted on a web server. The web portal may include a web page with hyperlinks (e.g., URLs) that a user may select to access remote applications that can be emulated on the user's desktop. Selecting one of the hyperlinks causes the emulation client for the remote application to be launched on the user's desktop and causes the web server to create connection information that the emulation client may use to connect to the remote application server. In order for the emulated application to participate in the context session managed by the context-sharing engine, the proxy server, web server agent, and/or context sharing engine may inject a token into the connection information that is used to connect to the remote application server.

The emulation client uses this connection information to connect to the remote application server, and the one or more context-sharing software components installed on the remote application server intercepts the connection request from the emulation client, extracts the token information identifying the context session from the request, and uses this information in one or more communications with the context server to participate in the existing context session.

The examples above describe injecting code into a web page to augment the functionality of the web page to coordinate sharing of context and session management across multiple different web-based application programs. However, the invention is not limited in this respect, as the code injected into a web page may add any suitable functionality. For example, a first medical application that provides information about lab results for a patient may not provide a function to allow a user to navigate to a second medical application that provides medical prescription order and processing functionality. Thus, in some embodiments, the code injected into a web page can augment an application by providing a button, web link, or some other interface that allows a user to navigate to a different application program. In the example above, code may be injected into the web page of the first application program that inserts a button that enables a user to navigate to the second web application. When the button is selected, the second application may be launched in a separate browser window and the user may be automatically logged in using the single sign on techniques discussed above. In addition, the second application may be automatically tuned to the patient context of the first application using the context sharing techniques discussed above. This simplifies the user interaction because the user does not have to open a separate browser window for the second application, navigate to the second application, authenticate and log in to the second application, and then change the second application to the desired patient context.

In the examples above, code is injected into a web page of a web-based application program by a web proxy server that "intercepts" requests from a web browser to the server on which the web-based application program executes. However, the invention is not limited in this respect, as code (e.g., the context-sharing engine discussed above) may be inserted into a web page in any suitable way, as the invention is not limited in this respect.

For example, in some embodiments, the code that is inserted into a web page may be inserted by the web server that hosts the web-based application. For example, some web servers allow a filter or other plug-in to identify and modify requests and/or responses to requests passing through the web server. Such a filter or plug-in may be used to insert the code into the web pages of application programs for which context sharing functionality is being provided.

In some embodiments, the web-based application program itself may be modified to include the code (e.g., context-sharing engine discussed above) that provides context-sharing functionality. In such embodiments, the web pages generated by the application program would include the context-sharing code and additional code would not need to be inserted by a proxy server or web server.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable storage medium (e.g., a computer memory, a floppy disk, a compact disk, a tape, and/or other tangible storage media.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user), in the manners described above.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method comprising:
  receiving, by a web proxy of a context management system, a request for a login page of a first web-based application program hosted by a first web server, wherein:
    the context management system provides single sign-on functionality and context-sharing functionality to multiple web-based application programs including at least the first web-based application program and a second web-based application program hosted by a second web server, and
    requests from a web browser executing on a client computer are redirected to the web proxy when the requests correspond to the web-based application programs to which the context management system provides the single sign-on functionality and the context-sharing functionality;
  obtaining, by the web proxy, the login page of the first web-based application program from the first web server;
  transforming, by the web proxy, the login page of the first web-based application program by inserting software code that provides the single sign-on functionality to the first web-based application program into the login page of the first web-based application program, wherein the software code that provides the single sign-on functionality to the first web-based application program, when executed by the web browser on the client computer, causes the web browser to send single sign-on credentials supplied by a user of the client computer to a context-sharing server of the context management system to sign the user into the first web-based application program;
  forwarding, by the web proxy to a first instance of the web browser, the login page of the first web-based application program including the software code that provides the single sign-on functionality to the first web-based application program;
  receiving, by the web proxy, a request for a login page of the second web-based application program while the user is logged into the first web-based application program;
  obtaining, by the web proxy, the login page of the second web-based application program from the second web server;
  transforming, by the web proxy, the login page of the second web-based application program by inserting software code that provides the single sign-on functionality to the second web-based application program into the login page of the second web-based application program, wherein the software code that provides the single sign-on functionality to the second web-based application program, when executed by the web browser on the client computer, causes the web browser to interface with the context-sharing server to automatically sign the user into the second web-based application program;
  forwarding, by the web proxy to a second instance of the web browser, the login page of the second web-based application program including the software code that provides the single sign-on functionality to the second web-based application program;
  obtaining, by the web proxy, a web page of the first web-based application program and a web page of the second web-based application program in response to requests received while the user is logged into the first web-based application program and the second web-based application program;
  transforming, by the web proxy, the web page of the first web-based application program and the web page of the second web-based application program by inserting software code that provides the context-sharing functionality into the web page of the first web-based application program and the web page of the second web-based application program, wherein:
    the software code that provides the context-sharing functionality, when executed by the web browser on the client computer, causes the first instance of the web browser to implement a first context-sharing engine and causes the second instance of the web browser to implement a second context-sharing engine,
    the first context-sharing engine notifies the context-sharing server of context changes in the first web-based application program and is notified by the context-sharing server of context changes in the second web-based application program, and
    the second context-sharing engine notifies the context-sharing server of context changes in the second web-based application program and is notified by the context-sharing server of context changes in the first web-based application program;
  forwarding, by the web proxy to the first instance of the web browser, the web page of the first web-based application program including the software code that provides the context-sharing functionality;

forwarding, by the web proxy to the second instance of the web browser, the web page of the second web-based application program including the software code that provides the context-sharing functionality;

receiving, by the web proxy, a request to change context that was sent by the second context-sharing engine in response to being notified by the context-sharing server of a change in context in the first web-based application program;

obtaining, by the web proxy, a requested web page of the second web-based application program from the second web server;

transforming, by the web proxy, the requested web page of the second web-based application program to generate a modified web page that reflects the change in context and includes the software code that provides the context-sharing functionality; and forwarding, by the web proxy, the modified web page to the second instance of the web browser.

2. The method of claim 1, wherein:
the web browser sends to the context-sharing server a request to determine if the user of the client computer is logged into the context-sharing server, and
the web browser receives from the context-sharing server an indication of whether the user is logged into the context-sharing server.

3. The method of claim 1, wherein:
the context-sharing server stores the single sign-on credentials supplied by the user of the client computer.

4. The method of claim 3, wherein:
the software code that provides the single sign-on functionality to the second web-based application program, when executed by the web browser on the client computer, requests and receives the single sign-on credentials from the context-sharing server.

5. The method of claim 4, wherein:
the software code that provides the single sign-on functionality to the second web-based application program, when executed by the web browser on the client computer, enters the single sign-on credentials into the login page of the second web-based application program and submits the login page of the second web-based application program including the single sign-on credentials to the second web server.

6. The method of claim 5, further comprising:
receiving, by the web proxy, a response indicating that log in to the second web-based application program was successful.

7. The method of claim 1, wherein:
the software code that provides the single sign-on functionality to the first web-based application program, when executed by the web browser on the client computer, prompts the user to input updated single sign-on credentials for the first web-based application program if logging in to the first web-based application program is not successful; and
the context-sharing server stores the updated single sign-on credentials.

8. The method of claim 1, wherein:
the software code that provides the single sign-on functionality to the first web-based application program, when executed by the web browser on the client computer, performs a keep-alive technique to keep the user logged into the first web-based application program.

9. The method of claim 1, wherein:
the software code that provides the single sign-on functionality to the first web-based application program, when executed by the web browser on the client computer, prompts the user to input the single sign-on credentials by displaying a single sign-on login page hosted on the context-sharing server.

10. The method of claim 1, wherein:
the software code that provides the single sign-on functionality to the first web-based application program, when executed by the web browser on the client computer, prompts the user to input the single sign-on credentials by displaying the login page of the first web-based application via the web browser.

11. The method of claim 10, wherein:
the login page of the first web-based application displays a watermark in an input field to indicate that the single sign-on credentials are being provided to the context-sharing server for storage and future use.

12. The method of claim 1, wherein:
the first web-based application program comprises a search engine, and
the context of the first web-based application program comprises the user performing a new search.

13. The method of claim 1, wherein the change in context of the first web-based application program comprises the user requesting medical records of a particular patient.

14. The method of claim 13, wherein the modified web page that reflects the change in context displays billing records of the particular patient.

15. The method of claim 1, wherein redirection of requests to the web proxy is provided by at least one of the web browser, a domain name service (DNS) server, and a DNS proxy server.

16. The method of claim 15, wherein the web browser is configured to redirect requests corresponding to the first web-based application program and the second web-based application program to the web proxy.

17. The method of claim 15, wherein the DNS server is configured to map domain names of the first web server and the second web server to an IP address of the web proxy.

18. The method of claim 15, wherein the DNS proxy is configured to intercept DNS requests to the DNS server and to respond to the DNS requests by supplying an IP address of the web proxy.

19. The method of claim 15, wherein the context management system comprises the DNS proxy server.

20. The method of claim 1, wherein:
the first context-sharing engine and the second context sharing engine are instructed by the context-sharing server to lock displayed browser windows when a most recent user access request is not within a predetermined amount of time.

21. The method of claim 1, wherein at least one of the first context-sharing engine and the second context-sharing engine is configured to receive notifications from the context-sharing server of changes in context in a remotely executing application program that is emulated on the client computer using an emulation client.

22. The method of claim 21, wherein the software code that provides the context-sharing functionality joins the remotely execution application program to an existing context session which includes the first web-based application program and the second web-based application program.

23. At least one tangible computer-readable device encoded with computer-executable instructions that, when executed, cause at least one computer to perform a method comprising:

receiving, by a web proxy of a context management system, a request for a login page of a first web-based application program hosted by a first web server, wherein:
   the context management system provides single sign-on functionality and context-sharing functionality to multiple web-based application programs including at least the first web-based application program and a second web-based application program hosted by a second web server, and
   requests from a web browser executing on a client computer are redirected to the web proxy when the requests correspond to the web-based application programs to which the context management system provides the single sign-on functionality and the context-sharing functionality;

obtaining, by the web proxy, the login page of the first web-based application program from the first web server;

transforming, by the web proxy, the login page of the first web-based application program by inserting software code that provides the single sign-on functionality to the first web-based application program into the login page of the first web-based application program, wherein the software code that provides the single sign-on functionality to the first web-based application program, when executed by the web browser on the client computer, causes the web browser to send single sign-on credentials supplied by a user of the client computer to a context-sharing server of the context management system to sign the user into the first web-based application program;

forwarding, by the web proxy to a first instance of the web browser, the login page of the first web-based application program including the software code that provides the single sign-on functionality to the first web-based application program;

receiving, by the web proxy, a request for a login page of the second web-based application program while the user is logged into the first web-based application program;

obtaining, by the web proxy, the login page of the second web-based application program from the second web server;

transforming, by the web proxy, the login page of the second web-based application program by inserting software code that provides the single sign-on functionality to the second web-based application program into the login page of the second web-based application program, wherein the software code that provides the single sign-on functionality to the second web-based application program, when executed by the web browser on the client computer, causes the web browser to interface with the context-sharing server to automatically sign the user into the second web-based application program;

forwarding, by the web proxy to a second instance of the web browser, the login page of the second web-based application program including the software code that provides the single sign-on functionality to the second web-based application program;

obtaining, by the web proxy, a web page of the first web-based application program and a web page of the second web-based application program in response to requests received while the user is logged into the first web-based application program and the second web-based application program;

transforming, by the web proxy, the web page of the first web-based application program and the web page of the second web-based a licaionm m by inserting n software code that provides the context-sharing functionality into the web page of the first web-based application program and the web page of the second web-based application program, wherein:
   the software code that provides the context-sharing functionality, when executed by the web browser on the client computer, causes the first instance of the web browser to implement a first context-sharing engine and causes the second instance of the web browser to implement a second context-sharing engine,
   the first context-sharing engine notifies the context-sharing server of context changes in the first web-based application program and is notified by the context-sharing server of context changes in the second web-based application program, and
   the second context-sharing engine notifies the context-sharing server of context changes in the second web-based application program and is notified by the context-sharing server of context changes in the first web-based application program;

forwarding, by the web proxy to the first instance of the web browser, the web page of the first web-based application program including the software code that provides the context-sharing functionality;

forwarding, by the web proxy to the second instance of the web browser, the web page of the second web-based application program including the software code that provides the context-sharing functionality;

receiving, by the web proxy, a request to change context that was sent by the second context-sharing engine in response to being notified by the context-sharing server of a change in context in the first web-based application program;

obtaining, by the web proxy, a requested web page of the second web-based application program from the second web server;

transforming, by the web proxy, the requested web page of the second web-based application program to generate a modified web page that reflects the change in context and includes the software code that provides the context-sharing functionality; and forwarding, by the web proxy, the modified web page to the second instance of the web browser.

24. The at least one tangible computer-readable device of claim 23, wherein:
   the web browser sends to the context-sharing server a request to determine if the user of the client computer is logged into the context-sharing server, and
   the web browser receives from the context-sharing server an indication of whether the user is logged into the context-sharing server.

25. The at least one tangible computer-readable device of claim 23, wherein:
   the context-sharing server stores the single sign-on credentials supplied by the user of the client computer.

26. The at least one tangible computer-readable device of claim 25, wherein:
   the software code that provides the single sign-on functionality to the second web-based application program, when executed by the web browser on the client computer, requests and receives the single sign-on credentials from the context-sharing server.

27. The at least one tangible computer-readable device of claim 26, wherein:
the software code that provides the single sign-on functionality to the second web-based application program, when executed by the web browser on the client computer, enters the single sign-on credentials into the login page of the second web-based application program and submits the login page of the second web-based application program including the single sign-on credentials to the second web server.

28. The at least one tangible computer-readable device of claim 27, wherein the method further comprises:
receiving, by the web proxy, a response indicating that log in to the second web-based application program was successful.

29. The at least one tangible computer-readable device of claim 23, wherein:
the software code that provides the single sign-on functionality to the first web-based application program, when executed by the web browser on the client computer, prompts the user to input updated single sign-on credentials for the first web-based application program if logging in to the first web-based application program is not successful; and
the context-sharing server stores the updated single sign-on credentials.

30. The at least one tangible computer-readable device of claim 23, wherein:
the software code that provides the single sign-on functionality to the first web-based application program, when executed by the web browser on the client computer, performs a keep-alive technique to keep the user logged into the first web-based application program.

31. The at least one tangible computer-readable device of claim 23, wherein:
the software code that provides the single sign-on functionality to the first web-based application program, when executed by the web browser on the client computer, prompts the user to input the single sign-on credentials by displaying a single sign-on login page hosted on the context-sharing server.

32. The at least one tangible computer-readable device of claim 23, wherein:
the software code that provides the single sign-on functionality to the first web-based application program, when executed by the web browser on the client computer, prompts the user to input the single sign-on credentials by displaying the login page of the first web-based application via the web browser.

33. The at least one tangible computer-readable device of claim 32, wherein:
the login page of the first web-based application displays a watermark in an input field to indicate that the single sign-on credentials are being provided to the context-sharing server for storage and future use.

34. The at least one tangible computer-readable device of claim 23, wherein:
the first web-based application program comprises a search engine, and
the change in context of the first web-based application program comprises the user performing a new search.

35. The at least one tangible computer-readable device of claim 23, wherein the change in context of the first web-based application program comprises the user requesting medical records of a particular patient.

36. The at least one tangible computer-readable device of claim 35, wherein the modified web page that reflects the change in context displays billing records of the particular patient.

37. The at least one tangible computer-readable device of claim 23, wherein redirection of requests to the web proxy is provided by at least one of the web browser, a domain name service (DNS) server, and a DNS proxy server.

38. The at least one tangible computer-readable device of claim 37, wherein the web browser is configured to redirect requests corresponding to the first web-based application program and the second web-based application program server to the web proxy.

39. The at least one tangible computer-readable device of claim 37, wherein the DNS server is configured to map domain names of the first web server and the second web server to an IP address of the web proxy.

40. The at least one tangible computer-readable device of claim 37, wherein the DNS proxy is configured to intercept DNS requests to the DNS server and to respond to the DNS requests by supplying an IP address of the web proxy.

41. The at least one tangible computer-readable device of claim 37, wherein the context management system comprises the DNS proxy server.

42. The at least one tangible computer-readable device of claim 23, wherein:
the first context-sharing engine and the second context sharing engine are instructed by the context-sharing server to lock displayed browser windows when a most recent user access request is not within a predetermined amount of time.

43. The at least one tangible computer-readable device of claim 23, wherein at least one of the first context-sharing engine and the second context-sharing engine is configured to receive notifications from the context-sharing server of changes in context in a remotely executing application program that is emulated on the client computer using an emulation client.

44. The at least one tangible computer-readable device of claim 43, wherein the software code that provides the context-sharing functionality joins the remotely execution application program to an existing context session which includes the first web-based application program and the second web-based application program.

45. At least one computer comprising:
memory storing processor-executable instructions; and
at least one processor, coupled to the memory, that executes the processor-executable instructions to:
receive, by a web proxy of a context management system, a request for a login page of a first web-based application program hosted by a first web server, wherein:
the context management system provides single sign-on functionality and context-sharing functionality to multiple web-based application programs including at least the first web-based application program and a second web-based application program hosted by a second web server, and
requests from a web browser executing on a client computer are redirected to the web proxy when the requests correspond to the web-based application programs to which the context management system provides the single sign-on functionality and the context-sharing functionality;
obtain, by the web proxy, the login page of the first web-based application program from the first web server;
transform, by the web proxy, the login page of the first web-based application program by inserting software code that provides the single sign-on functionality to the first web-based application program into the login page of the first web-based application program, wherein the software code that provides the single sign-on functionality to the first web-based application program, when executed by the web browser on the client computer, causes the web browser to send single sign-on credentials supplied by a user of the client computer to a context-sharing server of the context management system to sign the user into the first web-based application program;

forward, by the web proxy to a first instance of the web browser, the login page of the first web-based application program including the software code that provides the single sign-on functionality to the first web-based application program;

receive, by the web proxy, a request for a login page of the second web-based application program while the user is logged into the first web-based application program;

obtain, by the web proxy, the login page of the second web-based application program from the second web server;

transform, by the web proxy, the login page of the second web-based application program by inserting software code that provides the single sign-on functionality to the second web-based application program into the login page of the second web-based application program, wherein the software code that provides the single sign-on functionality to the second web-based application program, when executed by the web browser on the client computer, causes the web browser to interface with the context-sharing server to automatically sign the user into the second web-based application program;

forward, by the web proxy to a second instance of the web browser, the login page of the second web-based application program including the software code that provides the single sign-on functionality to the second web-based application program;

obtain, by the web proxy, a web page of the first web-based application program and a web page of the second web-based application program in response to requests received while the user is logged into the first web-based application program and the second web-based application program;

transform, by the web proxy, the web page of the first web-based application program and the web page of the second web-based application program by inserting software code that provides the context-sharing functionality into the web page of the first web-based application program and the web page of the second web-based application program, wherein:

the software code that provides the context-sharing functionality, when executed by the web browser on the client computer, causes the first instance of the web browser to implement a first context-sharing engine and causes the second instance of the web browser to implement a second context-sharing engine, the first context-sharing engine notifies the context-sharing server of context changes in the first web-based application program and is notified by the context-sharing server of context changes in the second web-based application program, and the second context-sharing engine notifies the context-sharing server of context changes in the second web-based application program and is notified by the context-sharing server of context changes in the first web-based application program;

forward, by the web proxy to the first instance of the web browser, the web page of the first web-based application program including the software code that provides the context-sharing functionality;

forward, by the web proxy to the second instance of the web browser, the web page of the second web-based application program including the software code that provides the context-sharing functionality;

receive, by the web proxy, a request to change context that was sent by the second context-sharing engine in response to being notified by the context-sharing server of a change in context in the first web-based application program;

obtain, by the web proxy, a requested web page of the second web-based application program from the second web server;

transform, by the web proxy, the requested web page of the second web-based application program to generate a modified web page that reflects the change in context and includes the software code that provides the context-sharing functionality; and forward, by the web proxy, the modified web page to the second instance of the web browser.

46. The at least one computer of claim 45, wherein:
the web browser sends to the context-sharing server a request to determine if the user of the client computer is logged into the context-sharing server, and
the web browser receives from the context-sharing server an indication of whether the user is logged into the context-sharing server.

47. The at least one computer of claim 46, wherein:
the context-sharing server stores the single sign-on credentials supplied by the user of the client computer.

48. The at least one computer of claim 47, wherein:
the software code that provides the single sign-on functionality to the second web-based application program, when executed by the web browser on the client computer, requests and receives the single sign-on credentials from the context-sharing server.

49. The at least one computer of claim 48, wherein:
the software code that provides the single sign-on functionality to the second web-based application program, when executed by the web browser on the client computer, enters the single sign-on credentials into the login page of the second web-based application program and submits the login page of the second web-based application program including the single sign-on credentials to the second web server.

50. The at least one computer of claim 49, wherein the at least one processor executes the processor-executable instructions to:
receive, by the web proxy, a response indicating that log in to the second web-based application program was successful.

51. The at least one computer of claim 45, wherein:
the software code that provides the single sign-on functionality to the first web-based application program, when executed by the web browser on the client computer, prompts the user to input updated single sign-on credentials for the first web-based application program if logging in to the first web-based application program is not successful; and
the context-sharing server stores the updated single sign-on credentials.

52. The at least one computer of claim 45, wherein:
the software code that provides the single sign-on functionality to the first web-based application program, when executed by the web browser on the client computer, performs a keep-alive technique to keep the user logged into the first web-based application program.

53. The at least one computer of claim 45, wherein:
the software code that provides the single sign-on functionality to the first web-based application program, when executed by the web browser on the client computer, prompts the user to input the single sign-on credentials by displaying a single sign-on login page hosted on the context-sharing server.

54. The at least one computer of claim 45, wherein:
the software code that provides the single sign-on functionality to the first web-based application program, when executed by the web browser on the client computer, prompts the user to input the single sign-on credentials by displaying the login page of the first web-based application via the web browser.

55. The at least one computer of claim 54, wherein:
the login page of the first web-based application displays a watermark in an input field to indicate that the single sign-on credentials are being provided to the context-sharing server for storage and future use.

56. The at least one computer of claim 45, wherein:
the first web-based application program comprises a search engine, and
the change in context of the first web-based application program comprises the user performing a new search.

57. The at least one computer of claim 45, wherein the change in context of the first web-based application program comprises the user requesting medical records of a particular patient.

58. The at least one computer of claim 57, wherein the modified web page that reflects the change in context displays billing records of the particular patient.

59. The at least one computer of claim 45, wherein the web browser is configured to redirect requests corresponding to the first web-based application program and the second web-based application program to the web proxy.

60. The at least one computer of claim 45, wherein redirection of requests to the web proxy is provided by a domain name service (DNS) server configured to map the domain names of the first web server and the second web server to an IP address of the web proxy.

61. The at least one computer of claim 45, wherein redirection of requests to the web proxy is provided by a domain name service (DNS) proxy server configured to intercept DNS requests to a DNS server and to respond to the DNS requests by supplying an IP address of the web proxy.

62. The at least one computer of claim 45, wherein:
the first context-sharing engine and the second context sharing engine are instructed by the context-sharing server to lock displayed browser windows when a most recent user access request is not within a predetermined amount of time.

63. The at least one computer of claim 45, wherein at least one of the first context-sharing engine and the second context-sharing engine is configured to receive notifications from the context-sharing server of changes in context in a remotely executing application program that is emulated on the client computer using an emulation client.

64. The at least one computer of claim 63, wherein the software code that provides the context-sharing functionality joins the remotely execution application program to an existing context session which includes the first web-based application program and the second web-based application program.

* * * * *